(12) United States Patent
Cash et al.

(10) Patent No.: US 11,566,162 B2
(45) Date of Patent: Jan. 31, 2023

(54) GAS HYDRATE INHIBITION USING METHANOL FOAM COMPOSITION

(71) Applicant: ChampionX USA Inc., Sugarland, TX (US)

(72) Inventors: Michael Cash, Richmond, TX (US); Carter M. Silvernail, Burnsville, MN (US); Hilina Emiru, Rosemount, MN (US)

(73) Assignee: ChampionX USA Inc., Sugarland, TX (US)

(*) Notice: Subject to any disclaimer, the term of this patent is extended or adjusted under 35 U.S.C. 154(b) by 269 days.

(21) Appl. No.: 16/682,953

(22) Filed: Nov. 13, 2019

(65) Prior Publication Data
US 2020/0148939 A1 May 14, 2020

Related U.S. Application Data

(60) Provisional application No. 62/760,691, filed on Nov. 13, 2018.

(51) Int. Cl.
*C09K 8/536* (2006.01)

(52) U.S. Cl.
CPC .......... *C09K 8/536* (2013.01); *C09K 2208/22* (2013.01)

(58) Field of Classification Search
None
See application file for complete search history.

(56) References Cited

U.S. PATENT DOCUMENTS

| | | | | |
|---|---|---|---|---|
| 4,557,837 | A | 12/1985 | Clark, III et al. | |
| 5,842,816 | A * | 12/1998 | Cunningham | E21B 33/076 |
| | | | | 15/104.062 |
| 6,022,421 | A * | 2/2000 | Bath | E21B 43/013 |
| | | | | 15/104.062 |
| 7,205,431 | B2 * | 4/2007 | Lal | C11D 1/755 |
| | | | | 562/18 |
| 7,279,447 | B2 * | 10/2007 | Lal | C09K 8/467 |
| | | | | 507/139 |
| 8,263,098 | B2 | 9/2012 | Fernandez de Castro et al. | |
| 9,351,484 | B2 * | 5/2016 | Musa | B01D 53/1468 |

(Continued)

FOREIGN PATENT DOCUMENTS

| | | |
|---|---|---|
| CA | 2 908 618 A1 | 10/2014 |
| WO | 2017/074393 A1 | 5/2017 |
| WO | 2017/125954 A1 | 7/2017 |

OTHER PUBLICATIONS

Chevil, K., "Investigation of Corrosion and Crack Morphology Behavior Under Disbonded Coatings on Pipelines," Thesis submitted in partial fulfillment of the requirements for the degree of Master of Science in Materials Engineering, Department of Chemical and Materials Engineering, University of Alberta, 2015, 179 pages.

(Continued)

*Primary Examiner* — John J Figueroa
(74) *Attorney, Agent, or Firm* — Stinson LLP

(57) ABSTRACT

A method is provided for inhibiting formation of a gas hydrate in a pipeline or removing a gas hydrate existing in a pipeline. The method can comprise injecting a foam composition into a fluid in the pipeline to inhibit formation of the gas hydrate in the pipeline, prevent gas hydrate formation in the pipeline, or remove the gas hydrate from the pipeline.

19 Claims, 1 Drawing Sheet

(56) References Cited

U.S. PATENT DOCUMENTS

| | | |
|---|---|---|
| 2006/0079431 A1* | 4/2006 | Lal .................... C09D 7/47 510/421 |
| 2007/0012451 A1* | 1/2007 | O'Neill .................. E21B 43/01 166/367 |
| 2007/0031370 A1* | 2/2007 | Carr ..................... C09K 8/602 424/78.28 |
| 2013/0098623 A1 | 4/2013 | Spencer et al. |
| 2014/0256998 A1 | 9/2014 | Hellsten et al. |
| 2014/0262297 A1 | 9/2014 | Huang |
| 2015/0087561 A1 | 3/2015 | Falana et al. |
| 2015/0337630 A1* | 11/2015 | Cioanta .................. E21B 37/00 166/177.2 |
| 2016/0060416 A1 | 3/2016 | Fernandez de Castro et al. |
| 2016/0161041 A1 | 6/2016 | Asher |
| 2016/0186039 A1 | 6/2016 | Owsik et al. |
| 2016/0222275 A1 | 8/2016 | Galindo et al. |
| 2016/0222277 A1 | 8/2016 | Waldvogel et al. |
| 2016/0257879 A1 | 9/2016 | Huang et al. |
| 2016/0289550 A1 | 10/2016 | Vo |
| 2016/0340571 A1 | 11/2016 | Liang et al. |
| 2016/0348848 A1 | 12/2016 | Webber et al. |
| 2017/0130122 A1 | 5/2017 | Reyes et al. |
| 2017/0145788 A1 | 5/2017 | Fouchard |
| 2018/0022989 A1 | 1/2018 | Stanciu et al. |
| 2018/0030340 A1 | 2/2018 | McCabe et al. |

OTHER PUBLICATIONS

Obanijesu, E. O., et al., "The Influence of Corrosion Inhibitors on Hydrate Formation Temperature Along the Subsea Natural Gas Pipelines," Geochimica et Cosmochimica Acta, 2014, 42 pages, vol. 120.

Sadat, S., et al., "Evaluating Ultrasonic Tomography (UT) Methods Used for the Inspection of Offshore Pipelines," Master's Thesis, Faculty of Science and Technology, University of Stavangar, Jun. 15, 2015, 82 pages.

Sannes, J., "Hydrate Plugs in Subsea Pipelines and Non-Invasive Methodology for Localization," Master's Thesis, Faculty of Science and Technology, University of Stavangar, Jun. 30, 2013, 93 pages.

Anderson, F. E., et al., "Inhibition of Gas Hydrates by Methanol," AIChE Journal, Aug. 1986, pp. 1321-1333, vol. 32, No. 8.

International Search Report and Written Opinion issued for PCT/US2019/061064, dated Feb. 12, 2020, 16 pages.

* cited by examiner

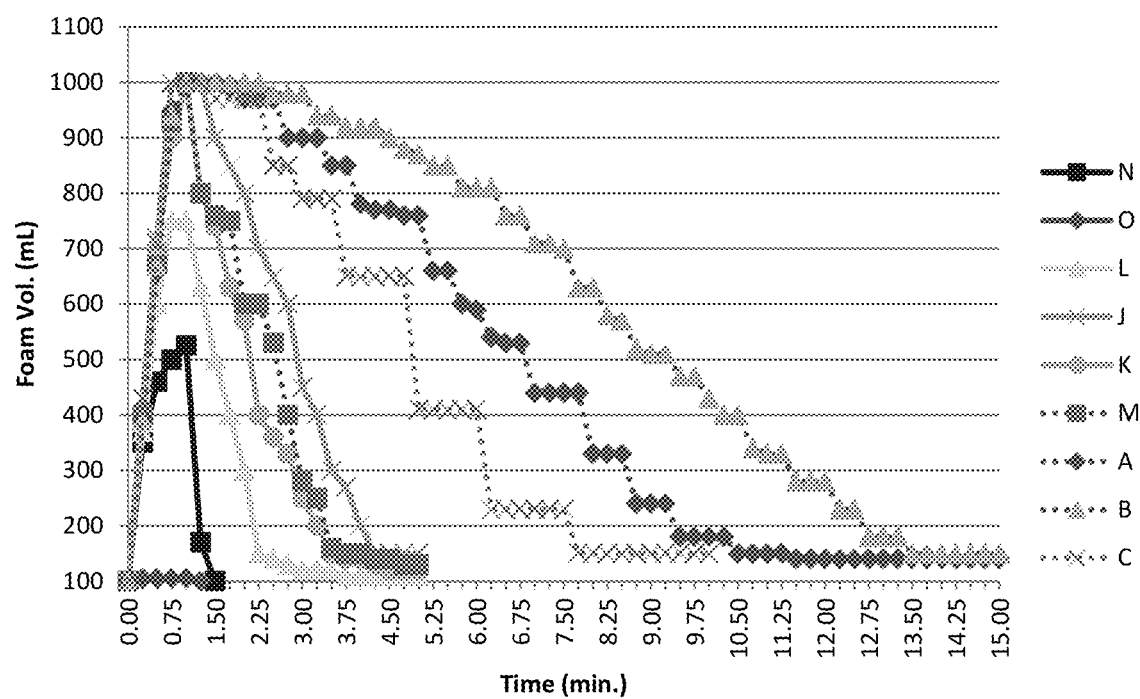

GAS HYDRATE INHIBITION USING METHANOL FOAM COMPOSITION

CROSS REFERENCE TO RELATED APPLICATIONS

This application claims the benefit of provisional patent application Ser. No. 62/760,691, filed Nov. 13, 2018.

STATEMENT REGARDING FEDERALLY SPONSORED RESEARCH OR DEVELOPMENT

Not applicable

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable

FIELD OF THE INVENTION

Foam compositions are provided for inhibiting formation of a gas hydrate or removing the gas hydrate from a pipeline used in storing or transporting a fluid comprising water, a gas, and optionally a liquid hydrocarbon.

BACKGROUND OF THE INVENTION

Low-boiling hydrocarbons, such as methane, ethane, propane, butane, and iso-butane, are normally present in conduits which are used for the transport and processing of oil and gas. If a substantial amount of water is also present, it is possible that the water/hydrocarbon mixture forms gas hydrate crystals under conditions of low temperature and elevated pressure. These crystals can be formed in a fluid whether the fluid is flowing or stationary.

Gas hydrates, also known as clathrates, are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure.

Gas hydrates can be easily formed during the transportation of oil and gas in pipelines under certain conditions. Factors affecting gas hydrate formation include gas composition, water content, temperature, and pressure, particularly low temperature and high pressure. While these crystalline cage-like structures are small initially, they are able to agglomerate into solid masses called gas hydrate plugs. The formation of gas hydrates within a pipeline often results in lost oil or gas production, damage to transmission lines and equipment, and safety hazards to field workers.

Sometimes gas hydrates form in unpiggable pipelines (i.e., pipelines that cannot be inspected with in-line tools such as pigs, including, but not limited to, a pipeline having a diameter of less than 12 inches, a pipeline of multiple diameters, a pipeline having short-radius or mitered bends, a pipeline having unbarred tees, deadlegs, crossovers or laterals, a pipeline without a pig launcher or a pig receiver, or a pipeline that cannot be physically cleaned by a pig). This can result in significant or even complete plugging of the pipeline such that fluid flow within the pipeline is significantly restricted or prevented. Conventional pigs are not recommended to be inserted to remove hydrate plugs since the pig can get stuck in the pipeline.

Three types of hydrate inhibitors are currently available to the energy industry for controlling gas hydrates: thermodynamic hydrate inhibitors (THIs), kinetic hydrate inhibitors (KHIs), and anti-agglomerates (AAs). THIs must be added in large amounts to be effective, typically on the order of several tens of percent by weight of the water present. On the other hand, KHIs and AAs are typically added on the order of one to five percent by weight of the water present.

Accordingly, there is an ongoing need for methods and compositions that can effectively inhibit the formation of gas hydrates or prevent gas hydrate formation, particularly in unpiggable pipelines.

BRIEF SUMMARY OF THE INVENTION

A method is provided for inhibiting formation of a gas hydrate or removing the gas hydrate from a pipeline used in storing or transporting a fluid comprising water, a gas, and optionally a liquid hydrocarbon. The method comprises injecting a foam composition into the fluid in the pipeline to inhibit formation of the gas hydrate in the pipeline or remove the gas hydrate from the pipeline. The foam composition comprises about 40-80 wt. % methanol; about 0.1-10 wt. % of a silicone-containing surface active agent; and about 20-50 wt. % a foam stabilizer. Alternatively, the method comprises injecting into the fluid in the pipeline about 40-80 wt. % methanol, about 0.1-10 wt. % of the silicone-containing surface active agent; and about 20-50 wt. % of the foam stabilizer based on total weight of the methanol, the silicone-containing surface active agent and the foam stabilizer that is injected into the fluid to inhibit formation of the gas hydrate in the pipeline or remove the gas hydrate from the pipeline.

The method can further comprise combining the methanol, the silicone-containing surface active agent and the foam stabilizer to form the foam composition.

The silicone-containing surface active agent can comprise a PEGylated dimethicone, a bis-PEGylated dimethicone, a PEG/PPG dimethicone, a polysiloxane, or a combination thereof.

The PEGylated dimethicone can comprise PEG-10 dimethicone, PEG-9 dimethicone, PEG-8 dimethicone, PEG-3 dimethicone, PEG-7 dimethicone, PEG-12 dimethicone, PEG-14 dimethicone, PEG-17 dimethicone, or a combination thereof. For example, the silicone-containing surface active agent can comprise PEG-10 dimethicone.

The bis-PEGylated dimethicone can comprise bis-PEG-[10-20] dimethicone, bis-PEG-10 dimethicone, bis-PEG-12 dimethicone, bis-PEG-17 dimethicone, bis-PEG-20 dimethicone, or a combination thereof.

The PEG/PPG dimethicone can comprise PEG/PPG-3/10 dimethicone, PEG/PPG-4/12 dimethicone, PEG/PPG-6/11 dimethicone, PEG/PPG-8/14 dimethicone, PEG/PPG-14/4 dimethicone, PEG/PPG-15/15 dimethicone, PEG/PPG-16/2 dimethicone, PEG/PPG-17/18 dimethicone, PEG/PPG-18/18 dimethicone, PEG/PPG-19/19 dimethicone, PEG/PPG-20/6 dimethicone, PEG/PPG-20/15 dimethicone, PEG/PPG-20/20 dimethicone, PEG/PPG-20/23 dimethicone, PEG/

PPG-20/29 dimethicone, PEG/PPG-22/23 dimethicone, PEG/PPG-22/24 dimethicone, PEG/PPG-23/6 dimethicone, PEG/PPG-25/25 dimethicone, PEG/PPG-27/27, bis-PEG/PPG 18/6 dimethicone, or a combination thereof.

The polysiloxane can comprise 1,1,1,3,5,5,5-heptamethyl-3-(propyl(poly(EO))acetate) trisiloxane, a polyether-modified polysiloxane, a polysiloxane betaine, or a combination thereof.

The foam stabilizer can comprise glycerin, cocodiethanolamide, monoethylene glycol, or a combination thereof. For example, the foam stabilizer can comprise glycerin and monoethylene glycol.

The foam composition can be substantially free of water.

The pipeline treated by the method can be an unpiggable pipeline. The unpiggable pipeline can comprise a pipeline having a diameter of less than 12 inches; a pipeline of multiple diameters; a pipeline having short-radius or mitered bends; a pipeline having unbarred tees, deadlegs, crossovers or laterals, a pipeline without a pig launcher or a pig receiver; or a pipeline that cannot be physically cleaned by a pig.

The fluid can comprise the liquid hydrocarbon.

The liquid hydrocarbon can comprise crude oil, heavy oil, processed residual oil, bituminous oil, coker oil, coker gas oil, fluid catalytic cracker feed, gas oil, naphtha, fluid catalytic cracking slurry, diesel fuel, fuel oil, jet fuel, gasoline, or kerosene. For example, the liquid hydrocarbon can comprise crude oil.

The foam composition can comprise about 50-80 wt. % methanol, or about 50-70 wt. % methanol.

The foam composition can comprise about 1-8 wt. %, or about 1-5 wt. % of a silicone-containing surface active agent.

The foam composition can comprise about 30-50 wt. %, or about 35-45 wt. % of the foam stabilizer.

A volume of the foam composition that is effective in inhibiting gas hydrate formation provides greater gas hydrate inhibition than the same volume of methanol when used in the pipeline under the same conditions.

Other objects and features will be in part apparent and in part pointed out hereinafter.

BRIEF DESCRIPTION OF THE SEVERAL VIEWS OF THE DRAWING

FIG. 1 is a graph of foam height over time for various inventive and comparative compositions.

DETAILED DESCRIPTION OF THE INVENTION

A method is provided for inhibiting formation of a gas hydrate in a pipeline or removing a gas hydrate existing in a pipeline. The method can comprise injecting a foam composition into a fluid in the pipeline to inhibit formation of the gas hydrate in the pipeline, prevent gas hydrate formation in the pipeline, or remove the gas hydrate from the pipeline. The foam composition has been discovered to provide equivalent or greater inhibition of gas hydrates than the same volume of methanol when used in the same pipeline under the same conditions. This discovery was unexpected since the silicone-containing surface active agent is not known to have thermodynamic hydrate inhibition activity and so would not have been expected to perform as well or better than methanol.

The method can further comprise combining the methanol, the silicone-containing surface active agent and the foam stabilizer to form the foam composition.

Alternatively, the method can comprise injecting into the fluid in the pipeline methanol, a silicone-containing surface active agent, and a foam stabilizer to inhibit formation of the gas hydrate in the pipeline or remove the gas hydrate from the pipeline. About 40-80 wt. % methanol, about 0.1-10 wt. % of the silicone-containing surface active agent; and about 20-50 wt. % of the foam stabilizer are injected into the fluid, based on the total weight of the methanol, the silicone-containing surface active agent and the foam stabilizer that is injected into the fluid. It has been discovered that the volume of the methanol, the silicone-containing surface active agent and the foam stabilizer that is effective in inhibiting gas hydrate formation provides greater gas hydrate inhibition than the same volume of methanol when used in the pipeline under the same conditions.

The methanol, silicone-containing surface active agent, and foam stabilizer form a foam within the pipeline. The foam is effective in removing a gas hydrate or inhibiting formation of a gas hydrate.

The foam composition or the methanol, silicone-containing surface active agent, and foam stabilizer can be injected into the fluid in the pipeline by conventional means, such as by introducing the foam composition into the fluid feed line to the pipeline, into any feed line for the pipeline, or into any opening for the pipeline.

The foam composition comprises about 40-80 wt. % methanol, about 0.1-10 wt. % of a silicone-containing surface active agent, and about 20-50 wt. % a foam stabilizer.

The foam composition can comprise about 40-80 wt. %, about 50-80 wt. %, or about 50-70 wt. % methanol. Alternatively, the methanol can comprise about 40-80 wt. %, about 50-80 wt. %, or about 50-70 wt. % of the total weight of the methanol, the silicone-containing surface active agent and the foam stabilizer that is injected into the fluid. Any grade of methanol can be used in the foam composition.

The silicone-containing surface active agent can comprise a PEGylated dimethicone, a bis-PEGylated dimethicone, a PEG/PPG dimethicone, a polysiloxane, or a combination thereof. Such silicone-containing surface active agents are commercially available from various sources.

The foam composition can comprise about 1-10 wt. %, about 1-8 wt. %, about 2-7 wt. %, about 3-6 wt. %, or about 1-5 wt. % of a silicone-containing surface active agent. Alternatively, the silicone-containing surface active agent can comprise about 1-10 wt. %, about 1-8 wt. %, about 2-7 wt. %, about 3-6 wt. %, or about 1-5 wt. % of the total weight of the methanol, the silicone-containing surface active agent and the foam stabilizer that is injected into the fluid.

The silicone-containing surface active agent can comprise a PEGylated dimethicone including, but not limited to, PEG-10 dimethicone (commercially available as SILSURF® DI-1010 from Siltech Corporation of Toronto, Ontario, Canada), PEG-9 dimethicone, PEG-8 dimethicone (SILSURF® E608), PEG-3 dimethicone, PEG-7 dimethicone, PEG-12 dimethicone (SILSURF® D212-CG), PEG-14 dimethicone, PEG-17 dimethicone, or a combination thereof. For example, the silicone-containing surface active agent can comprise PEG-10 dimethicone.

The silicone-containing surface active agent can comprise a bis-PEGylated dimethicone including, but not limited to, bis-PEG-[10-20] dimethicone, bis-PEG-10 dimethicone, bis-PEG-12 dimethicone (commercially available as SIL- SURF® DI-2012 or SILSURF® DI-1510), bis-PEG-17 dimethicone, bis-PEG-20 dimethicone, or a combination thereof.

The silicone-containing surface active agent can comprise a PEG/PPG dimethicone including, but not limited to, PEG/PPG-3/10 dimethicone, PEG/PPG-4/12 dimethicone, PEG/PPG-6/11 dimethicone, PEG/PPG-8/14 dimethicone, PEG/PPG-14/4 dimethicone, PEG/PPG-15/15 dimethicone, PEG/PPG-16/2 dimethicone, PEG/PPG-17/18 dimethicone, PEG/PPG-18/18 dimethicone (SILSURF® J1015-0-AC), PEG/PPG-19/19 dimethicone, PEG/PPG-20/6 dimethicone, PEG/PPG-20/15 dimethicone, PEG/PPG-20/20 Dimethicone, PEG/PPG-20/23 dimethicone, PEG/PPG-20/29 dimethicone, PEG/PPG-22/23 dimethicone, PEG/PPG-22/24 dimethicone, PEG/PPG-23/6 dimethicone, PEG/PPG-25/25 dimethicone, PEG/PPG-27/27, bis-PEG/PPG 18/6 dimethicone, or a combination thereof.

The silicone-containing surface active agent can comprise other polysiloxanes including, but not limited to, 1,1,1,3,5,5,5-heptamethyl-3-(propyl(poly(EO))acetate) trisiloxane, a polyether-modified polysiloxane, a polysiloxane betaine, or a combination thereof.

The foam stabilizer can comprise glycerin, cocodiethanolamide, monoethylene glycol, or a combination thereof. For example, the foam stabilizer can comprise glycerin and monoethylene glycol.

The foam composition can comprise about 20-50 wt. %, about 30-50 wt. %, or about 35-45 wt. % of the foam stabilizer. Alternatively, the foam stabilizer can comprise about 20-50 wt. %, about 30-50 wt. %, or about 35-45 wt. % of the total weight of the methanol, the silicone-containing surface active agent and the foam stabilizer that is injected into the fluid.

The foam composition, the methanol, the silicone-containing surface active agent, and the foam stabilizer can be substantially free of water since water contributes to the formation of gas hydrates. A component is "substantially free of water" if it contains less than 0.1, 0.5, 1, 2, 3, 4, 5, 6, 7, 8, 9 or 10 wt. % water. Preferably, the foam composition does not include any water other than the water present in its individual components. For example, methanol is available in various purity grades, and includes water as an impurity. Technical grade methanol typically includes 1.5% water. The silicone-containing surface active agent may be free of water. Technical grade foam stabilizers typically contain 2-5 wt. % water. One skilled in the art can select appropriate purity grades of the components of the foam composition to both minimize water content and cost of the components or the foam composition.

The pipeline can be any pipeline used in storing or transporting a fluid comprising water, a gas, and optionally a liquid hydrocarbon. For example, the pipeline can be a pipeline used in storing or transporting an oil or gas downstream of a well, wellbore or subterranean formation. Such pipelines can be used in midstream applications in an oil or gas system. Since the method enables control of gas hydrates without mechanical intervention such as pigging, the method is especially suitable for an unpiggable pipeline.

The unpiggable pipeline can comprise a pipeline having a diameter of less than 12 inches; a pipeline of multiple diameters; a pipeline having short-radius or mitered bends; a pipeline having unbarred tees, deadlegs, crossovers or laterals, a pipeline without a pig launcher or a pig receiver; or a pipeline that cannot be physically cleaned by a pig. Pipelines used in the oil and gas industry are often in remote and/or subsea locations that make mechanical cleaning impractical. The foam compositions of the invention are viable chemical alternative to mechanical cleaning.

The fluid within the pipeline comprises water, a gas, and optionally a liquid hydrocarbon.

When the fluid contains a liquid hydrocarbon, the liquid hydrocarbon can comprise crude oil, heavy oil, processed residual oil, bituminous oil, coker oil, coker gas oil, fluid catalytic cracker feed, gas oil, naphtha, fluid catalytic cracking slurry, diesel fuel, fuel oil, jet fuel, gasoline, or kerosene. For example, the liquid hydrocarbon can comprise crude oil.

The foam composition can be formulated as shown in the representative compositions of Table 1. These same proportions of components can be added directly to a fluid to obtain the same or similar effect in inhibiting gas hydrates.

TABLE 1

| Component | Composition | | | | | | | | | | | | | | |
|---|---|---|---|---|---|---|---|---|---|---|---|---|---|---|---|
| | A | B | C | D | E | F | G | H | I | J | K | L | M | N | O |
| Methanol | 50 | 50 | 50 | 50 | 55 | 55 | 60 | 70 | 80 | 80 | 80 | 85 | 80 | 97 | 95 |
| PEG-10 Dimethicone | 5 | 5 | 1 | 1 | | | | | | 5 | 10 | 5 | 5 | | |
| Polyether-modified polysiloxane | | | | | 10 | | | | | | | | | | |
| Bis-PEG-10 dimethicone | | | | | | 7 | | | | | | | | | |
| PEG-12 dimethicone | | | | | | | | 2 | | | | | | | |
| PEG/PPG 3/10 dimethicone | | | | | | | 8 | | | | | | | | |
| Polysiloxane betaine | | | | | | | | | 3 | | | | | | |
| Cocodiethanolamide | | | | | | | 32 | 13 | | | | | | | |
| Glycerin | | 45 | | 49 | | 19 | | | 17 | 15 | 10 | 10 | | | |
| Monoethylene Glycol | 45 | | 49 | | 35 | 19 | | 15 | | | | | 15 | | |
| Fluoroaliphatic polymeric ester | | | | | | | | | | | | | | 3 | 5 |

The foam composition can be prepared at room temperature by mixing the components of the composition in any order of addition. For example, the silicone-containing surface active agent can be added to the methanol to form a mixture, and the foam stabilizer can be added to the mixture. Alternatively, the silicone-containing surface active agent and the foam stabilizer can be mixed before being added to methanol.

Regarding the method of use, the order of addition is not critical when the components are added sequentially to the fluid rather than being prepared as a foam composition prior to injection. The components can be added within a short period of time, such as within 1-10 minutes of each other to promote mixing and interaction of the components within the fluid in the pipeline. Preferably, the components are blended in-line before reaching the pipeline that will be treated to produce a foam volume stable enough to foam as much of the pipeline as possible from point of injection.

The volume of foam composition or of methanol, silicone-containing surface active agent, and foam stabilizer can be about 1% to 100% of the volume of fluid in the pipeline, preferably 50% to 100%, and more preferably 80% to 100%.

The components/composition can be applied to the fluid to provide any selected concentration. In practice, the components/composition are typically added to a flow line to provide an effective treating dose of from about 1% to about 100%. The components/composition can be applied to the fluid to provide an actives concentration of 0.5% to about 100%, based on the volume of fluid in the pipeline, preferably 2.5% to 10%, and more preferably 10% to 20%. The actives concentration means the concentration of each of the components injected into the fluid or of the foam composition injected into the fluid. Each system can have its own dose level requirements, and the effective dose level of components/composition to sufficiently inhibit or remove gas hydrates can vary with the system in which it is used.

The components/composition can be applied continuously, in batch, or a combination thereof. The components/composition doses can be continuous to prevent gas hydrate formation. The components/composition doses can be intermittent (i.e., batch treatment) or the components/composition doses can be continuous/maintained and/or intermittent to inhibit gas hydrates.

Dosage rates for continuous treatments typically range from about 1% to about 100% based on the volume of fluid, preferably 50% to 80%, and more preferably 90% to 100%. Dosage rates for batch treatments typically range from about 1% to about 100%, preferably 70% to 100%, and more preferably 100% to 150%, and can range from about 100% to about 200% based on the volume of fluid.

The components or the foam composition can be provided at the site where gas hydrate inhibitors are injected into the pipeline by conventional means, such as in a tank of a truck. The components can be blended on site if desired before injecting the components into the fluid, or can be added separately to the fluid and blended inline.

Having described the invention in detail, it will be apparent that modifications and variations are possible without departing from the scope of the invention defined in the appended claims.

EXAMPLES

The following non-limiting examples are provided to further illustrate the invention.

Example 1

Compositions A-C and J-O as listed in Table 1 were prepared, tested and compared using a test derived from ASTM D892 for measuring the foam height, foam half-light, and foam build-up time of a foamer on production fluids. The most effective foamer has the greatest foam height, the shortest foam build-up time, and the longest foam half-life. Comparative composition N contained 3.33% (1% active) MASURF® FS-130 (a commercial fluorinated surfactant foamer available from Pilot Chemical Company) and 96.67% methanol. Comparative composition O contained 5% (1% active) MASURF® FS-3020 (a commercial fluorinated surfactant foamer available from Pilot Chemical Company) and 95% methanol.

Each of the Compositions A-C and J-O were prepared by mixing the ingredients to form 100 mL of each composition. Each composition was added to a 1000 mL graduated cylinder. The composition in the cylinder was tested at room temperature. A gas source was attached to an adapter to a gas sparge tube in the graduated cylinder and the valve was opened to foam the sample. Foam height was recorded at 15 second intervals for 60 seconds. The gas flow was stopped after 60 seconds or if the foam reached 1000 mL before testing reached 60 seconds. The foam collapse was recorded after gas flow was stopped until the foam completely collapsed. The sparge tube was removed and the timer reset to measure the time taken for one half of the volume of test solution to break out of its foaming tendency and back into liquid form. This time was recorded as the foam half-life. The results are shown in FIG. 1.

The foam half-life for Compositions A-C was 5.75, 8.25, and 4 minutes, respectively. Composition B was the most effective foamer having the greatest foam height and the longest foam half-life. All of the inventive compositions were significantly more effective foamers than the comparative compositions N and O.

Example 2

Composition B as listed in Table 1 was prepared and tested as compared to methanol on a vol/vol basis in a visual rocking cell test to evaluate its hydrate inhibition properties.

The rocking cells were charged with DI water, and then Composition B or methanol was added to each cell. Five dosage rates were tested: 20, 40, 60, 89 and 100 vol % methanol or Composition B based on the volume of fluid within the cell. The cells were pressurized to 13.8 MPa, and equilibrated at 24° C. until pressure was stabilized. The valve for the gas inlet was closed to maintain constant volume. The bath temperature was then cooled to 4.4° C. over 4 h with constant rocking. The cells continued to be rocked at 4.4° C. until failure or was stopped at about 20 h if failure did not occur. The results are shown in Table 2:

TABLE 2

| DOSE RATE (VOL %) | METHANOL | COMPOSITION B |
| --- | --- | --- |
| 20 | Failure | Failure |
| 40 | Failure | Failure |
| 60 | Pass | Pass |
| 80 | Disqualification* | Pass |
| 100 | Pass | Pass |

*Disqualification due to a dosing miscalculation.

The threshold passing dosage estimated for this test was 60 vol % methanol. Thus, there should be failures below that dosage and passing marks above that dosage. Since the tests were performed under constant volume conditions, any drop in pressure above 0.02 MPa indicated hydrate formation and was considered a failure. The results were also verified via visual observation. No significant foaming was noted in the cells (low shear); however, during cleaning/depressurization the cells did foam significantly. It was observed that Composition B and methanol had substantially equivalent performance as hydrate inhibitors in this test.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description and shown in the accompanying drawing shall be interpreted as illustrative and not in a limiting sense.

What is claimed is:

1. A method for inhibiting formation of a gas hydrate or removing the gas hydrate from a pipeline used in storing or transporting a fluid comprising water, a gas, and optionally a liquid hydrocarbon, the method comprising either:
   injecting a foam composition into the fluid in the pipeline to inhibit formation of the gas hydrate in the pipeline or remove the gas hydrate from the pipeline, the foam composition comprising:
      about 40-80 wt. % methanol;
      about 0.1-10 wt. % of a silicone-containing surface active agent; and
      about 20-50 wt. % of a foam stabilizer; or
   injecting into the fluid in the pipeline about 40-80 wt. % methanol, about 0.1-10 wt. % of the silicone-containing surface active agent; and about 20-50 wt. % of the foam stabilizer based on total weight of the methanol, the silicone-containing surface active agent and the foam stabilizer that is injected into the fluid to inhibit formation of the gas hydrate in the pipeline or remove the gas hydrate from the pipeline, wherein the pipeline is an unpiggable pipeline and the unpiggable pipeline comprises a pipeline that cannot be physically cleaned by a pig.

2. The method of claim 1, wherein the fluid comprises the liquid hydrocarbon.

3. The method of claim 2, wherein the liquid hydrocarbon comprises crude oil, heavy oil, processed residual oil, bituminous oil, coker oil, coker gas oil, fluid catalytic cracker feed, gas oil, naphtha, fluid catalytic cracking slurry, diesel fuel, fuel oil, jet fuel, gasoline, or kerosene.

4. The method of claim 1, wherein either the foam composition comprises about 50-80 wt. % methanol, or about 50-80 wt. % methanol is injected into the fluid based on total weight of the methanol, the silicone-containing surface active agent and the foam stabilizer that is injected into the fluid; or
   the foam composition comprises about 1-8 wt. % of the silicone-containing surface active agent, or about 1-8 wt. % of the silicone-containing surface active agent is injected into the fluid based on total weight of the methanol, the silicone-containing surface active agent and the foam stabilizer that is injected into the fluid; or
   the foam composition comprises about 30-50 wt. % of the foam stabilizer, or about 30-50 wt. % of the foam stabilizer is injected into the fluid based on total weight of the methanol, the silicone-containing surface active agent and the foam stabilizer that is injected into the fluid.

5. The method of claim 1, wherein the foam composition comprises about 50-70 wt. % methanol, or about 50-70 wt. % methanol is injected into the fluid based on total weight of the methanol, the silicone-containing surface active agent and the foam stabilizer that is injected into the fluid; or
   the foam composition comprises about 1-5 wt. % of the silicone-containing surface active agent, or about 1-5 wt. % of the silicone-containing surface active agent is injected into the fluid based on total weight of the methanol, the silicone-containing surface active agent and the foam stabilizer that is injected into the fluid; or
   the foam composition comprises about 35-45 wt. % of the foam stabilizer, or about 35-45 wt. % of the foam stabilizer is injected into the fluid based on total weight of the methanol, the silicone-containing surface active agent and the foam stabilizer that is injected into the fluid.

6. The method of claim 1, wherein a volume of the foam composition that is effective in inhibiting gas hydrate formation provides greater gas hydrate inhibition than the same volume of methanol when used in the pipeline under the same conditions, or the volume of the methanol, the silicone-containing surface active agent and the foam stabilizer that is effective in inhibiting gas hydrate formation provides greater gas hydrate inhibition than the same volume of methanol when used in the pipeline under the same conditions.

7. The method of claim 1, wherein the unpiggable pipeline is a pipeline having a diameter of less than 12 inches; a pipeline of multiple diameters; a pipeline having short-radius or mitered bends; a pipeline having unbarred tees, deadlegs, crossovers or laterals, or a pipeline without a pig launcher.

8. The method of claim 1, wherein the foam composition is injected into the fluid, and further comprising combining the methanol, the silicone-containing surface active agent and the foam stabilizer to form the foam composition.

9. The method of claim 1, wherein the foam composition is substantially free of water.

10. The method of claim 1, wherein the methanol, the silicone-containing surface active agent and the foam stabilizer are injected into the fluid.

11. The method of claim 10, wherein the methanol, the silicone-containing surface active agent and the foam stabilizer are mixed on site to form a foam composition before injection into the fluid.

12. The method of claim 1, wherein the silicone-containing surface active agent comprises a PEGylated dimethicone, a bis-PEGylated dimethicone, a PEG/PPG dimethicone, a polysiloxane, or a combination thereof.

13. The method of claim 12, wherein the silicone-containing surface active agent comprises the PEGylated dimethicone, and the PEGylated dimethicone comprises PEG-10 dimethicone, PEG-9 dimethicone, PEG-8 dimethicone, PEG-3 dimethicone, PEG-7 dimethicone, PEG-12 dimethicone, PEG-14 dimethicone, PEG-17 dimethicone, or a combination thereof.

14. The method of claim 12, wherein the silicone-containing surface active agent comprises the bis-PEGylated dimethicone, and the bis-PEGylated dimethicone comprises bis-PEG-[10-20] dimethicone, bis-PEG-10 dimethicone, bis-PEG-12 dimethicone, bis-PEG-17 dimethicone, bis-PEG-20 dimethicone, or a combination thereof.

15. The method of claim 12, wherein the silicone-containing surface active agent comprises the PEG/PPG dimethicone, and the PEG/PPG dimethicone comprises PEG/PPG-3/10 dimethicone, PEG/PPG-4/12 dimethicone, PEG/PPG-6/11 dimethicone, PEG/PPG-8/14 dimethicone, PEG/PPG-14/4 dimethicone, PEG/PPG-15/15 dimethicone, PEG/PPG-16/2 dimethicone, PEG/PPG-17/18 dimethicone, PEG/PPG-18/18 dimethicone, PEG/PPG-19/19 dimethicone, PEG/PPG-20/6 dimethicone, PEG/PPG-20/15 dimethicone, PEG/PPG-20/20 Dimethicone, PEG/PPG-20/23 dimethicone, PEG/PPG-20/29 dimethicone, PEG/PPG-22/23 dimethicone, PEG/PPG-22/24 dimethicone, PEG/PPG-23/6 dimethicone, PEG/PPG-25/25 dimethicone, PEG/PPG-27/27, bis-PEG/PPG 18/6 dimethicone, or a combination thereof.

16. The method of claim 12, wherein the silicone-containing surface active agent comprises the polysiloxane.

17. The method of claim 16, wherein the polysiloxane comprises 1,1,1,3,5,5,5-heptamethyl-3-(propyl(poly(EO)) acetate) trisiloxane, a polyether-modified polysiloxane, a polysiloxane betaine, or a combination thereof.

18. The method of claim 1, wherein the foam stabilizer comprises glycerin, cocodiethanolamide, monoethylene glycol, or a combination thereof.

19. The method of claim 18 wherein the foam stabilizer comprises glycerin and monoethylene glycol.

\* \* \* \* \*